7748X
J. Fisk,
Thrashing Mach.
Patented Sept. 9. 1833.
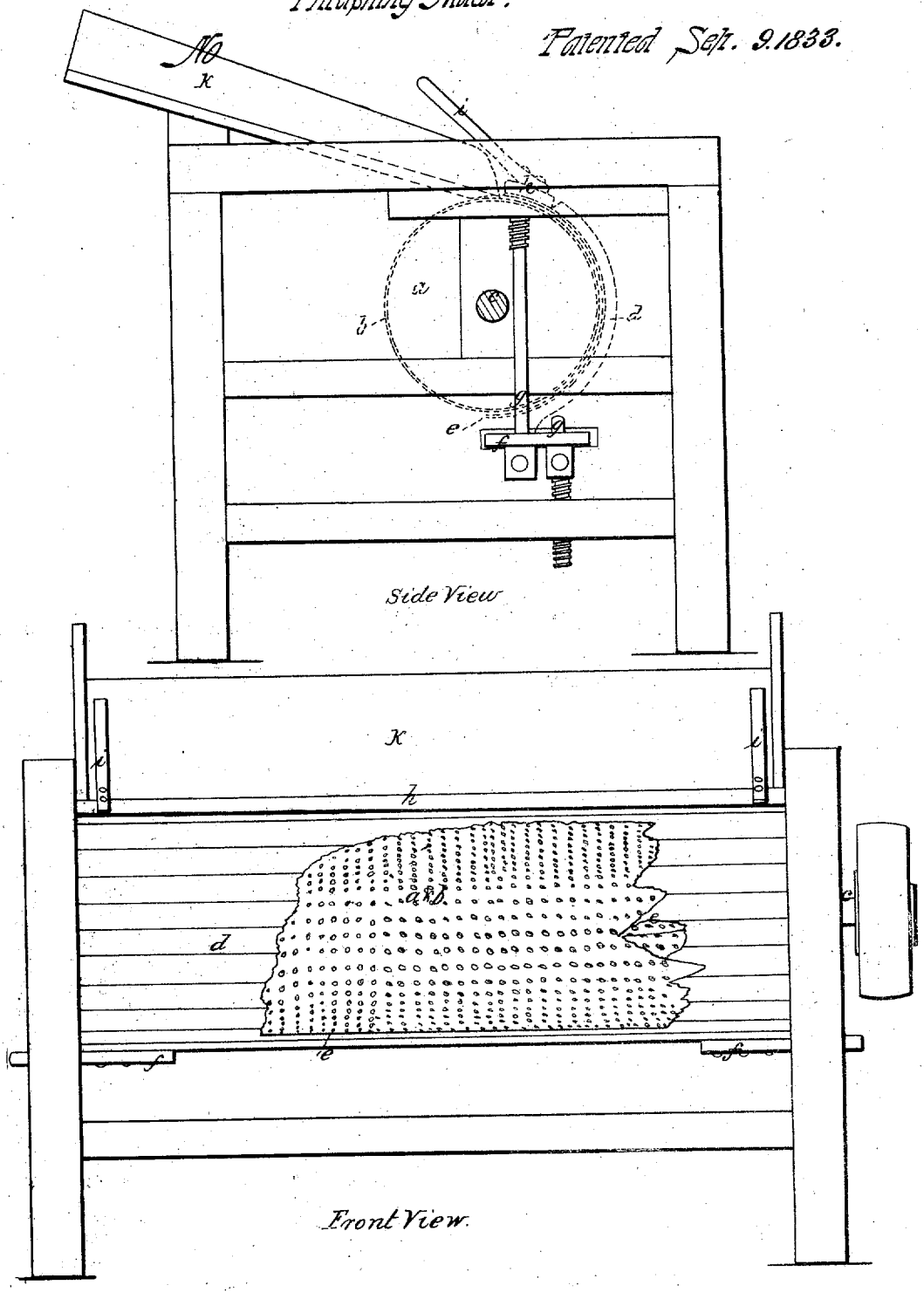

7748X                Sept. 9, 1833        437.

Jeremiah Fisk
Letters Patent   Patented 9. 1833. Sept.

The Schedule referred to in these Letters Patent, and making part of the same, containing a description in the words of the said Jeremiah Fisk himself of his improvements in the Thrashing Machine.

---

To all to whom these presents shall come. Be it known that I. Jeremiah Fisk, of Weld, in the county of Oxford & State of Maine, have invented a new and useful machine for thrashing wheat and other grain from the straw, for thrashing herds grass seed from the straw, & for separating clover seed from the chaff or hull & also for thrashing rice from the straw & separating it from the hull; & that the following is a full & exact description of the construction and operation of the said machine as invented & improved by me.

The principle of this improved & useful machine, consists in having a cylinder, say about two feet six inches in diameter and eight feet long, covered with sheet iron, perforated so as to render the external surface completely rough like a grater. This cylinder lies horizontally, and is made of wood, except the sheet iron covering and may be solid. In the centre of each end, is an iron or steel gudgeon or pin, on which this cylinder revolves, presenting the rough surface of the sheet iron to a curved bed constantly. This curved bed is situated obliquely backwards of the cylinder the upper part of it being called the regulator extends to the centre of the cylinder superiorly. It is made of good substantial wood, should be about two inches in thickness, and in length equal to that of the cylinder. The curvature of this bed is such, that when properly applied to the cylinder, there shall exist a uniform space between them, of about one fourth of an inch; and will encircle about one half of the circumference of the cylinder. This curved bed is supported at the ends by two planks. Through each of these

[illegible]

7748X planks are two holes near the ends made large enough to admit
screws with large shoulders, the holes being large enough to admit
a little play or movement when the screw is turned a little back.
The superior or upper screw in each plank enters a top rail or
cap piece in the frame (in which the cylinder revolves) above the
cylinder; while each of the inferior or lower screws enters a middle
short post below. By this arrangement the bed piece may be ap-
proached nearer to, or further receded from the cylinder at pleasure.
The concave surface of this bed piece is covered with perforated
sheet iron rendered grater like, so that the concave surface of the
bed piece shall correspond to the convex surface of the cylinder -
for every knife. The upper part of this curved bed piece, called
the regulator is six or seven inches in width, detached from the
other wood part of the bed and joined only by the sheet iron,
which also covers the inner surface of this, and serves also as a
hinge on which the regulator turns; so that this regulator may
be raised or depressed, enlarging or lessening the space between
it and the cylinder, to admit more or less feed at pleasure, hence
it is called the regulator. On the external side some handle or lever
may be attached, so as to graduate its elevation or depression.
Above the cylinder, and over the side opposite to the curved bed
is a slide or hopper made in the form of a plane inclined
towards the cylinder, with side pieces, to prevent the grain from
falling off; presenting the grain, straw &c to greater surface of
the cylinder, as fast as admitted by the regulator. This slide is
about two feet six inches in length, in width, equal to the
length of the cylinder. One of the pins on which this cylinder
revolves, serves as an axle to a wheel fastened on the out end,
to which the power is communicated to revolve the cylinder; the [. . .]
of the cylinder is always approaching the curved bed above, and
receding below.

This machine may be put in operation by means

7748X of hand, horse, steam or water power, and the dimensions of each part diminished or enlarged accordingly.

This cylinder being put in rapid motion as above described, the grain or other matter to be thrashed or hulled, is placed on the slide, and thrust forward to the rough surface of the cylinder; and carried thro' by the motion between the opposing surfaces of the cylinder and the curved bed which completely rends .. the hull & separates the grain or seed from it. In separating rice & smaller seeds from the hull it may be necessary to apply the curved bed nearer the cylinder than when thrashing from the straw. This is done by means of the screws with large Shoulders as before described. A wooden frame is to be constructed of joist or strong timbers, of dimensions adapted to the size and length of the cylinder & curved bed; with girts supported by two short posts for the pins in each end of the cylinder to hang or play on. Dated at Weld aforesaid this sixth day of April Anno Domini 1833.

Witnesses
Isaac Winship
Joshua Eaton

Jeremiah Fisk

Exd. W.E.

(924 words) — Patented September 9. 1833 —